United States Patent
Creusen et al.

(10) Patent No.: US 10,033,141 B2
(45) Date of Patent: Jul. 24, 2018

(54) LIGHTING DEVICE CONNECTOR COMPRISING A HEAT SINK

(71) Applicant: PHILIPS LIGHTING HOLDING B.V., Eindhoven (NL)

(72) Inventors: Martinus Petrus Creusen, Eindhoven (NL); Reinier Imre Anton Den Boer, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/027,159

(22) PCT Filed: Oct. 1, 2014

(86) PCT No.: PCT/EP2014/070995
§ 371 (c)(1),
(2) Date: Apr. 4, 2016

(87) PCT Pub. No.: WO2015/049258
PCT Pub. Date: Apr. 9, 2015

(65) Prior Publication Data
US 2016/0254623 A1    Sep. 1, 2016

(30) Foreign Application Priority Data

Oct. 4, 2013  (EP) .................................. 13187424

(51) Int. Cl.
*F21V 29/70* (2015.01)
*H01R 13/717* (2006.01)
(Continued)

(52) U.S. Cl.
CPC ......... *H01R 13/7175* (2013.01); *F21V 23/06* (2013.01); *F21V 29/70* (2015.01);
(Continued)

(58) Field of Classification Search
CPC .... H01R 33/00; H01R 33/76; H01R 33/0836; H01R 12/28; H01R 24/20; H01R 13/506; F21K 9/20; F21V 29/70; G06F 1/20
(Continued)

(56) References Cited

U.S. PATENT DOCUMENTS 3,237,341 A * 3/1966 Janning .................... F21S 9/02
                                                  273/238
4,573,754 A * 3/1986 Hill ...................... H01R 33/965
                                                  439/280
(Continued)

FOREIGN PATENT DOCUMENTS

CN       202884549 U    4/2013
EP        0806817 A1   12/1997
(Continued)

*Primary Examiner* — Harshad C Patel
(74) *Attorney, Agent, or Firm* — Akarsh P. Belagodu

(57) ABSTRACT

According to an aspect, a connector plug (11) for a lighting device (12) is provided. The connector plug comprises a fastening arrangement (13) for mechanically coupling the lighting device to the connector plug, and an electronic contact (15) arranged to transfer power to, and communicate data with the lighting device coupled to the connector plug. Further, the connector plug comprises a heat sink (17) having a heat reception interface (18) arranged to receive heat from the lighting device coupled to the connector plug and a heat dissipation interface arranged to dissipate at least some of the heat received via the heat reception interface. The present aspect is based on a concept of utilizing the connector plug for dissipating heat from the lighting device, whereby the overall heat dissipation from the lighting device increases, which promotes a longer life time of the lighting device.

17 Claims, 3 Drawing Sheets

(51) Int. Cl.
*F21V 23/06* (2006.01)
*H01R 24/20* (2011.01)
*H01R 13/631* (2006.01)
*H01R 24/62* (2011.01)
*G06F 1/20* (2006.01)
*H01R 13/506* (2006.01)
*H01R 33/08* (2006.01)
*H01R 107/00* (2006.01)
*F21Y 115/10* (2016.01)
*F21Y 101/00* (2016.01)

(52) U.S. Cl.
CPC .......... *H01R 13/631* (2013.01); *H01R 24/20* (2013.01); *H01R 24/62* (2013.01); *F21Y 2101/00* (2013.01); *F21Y 2115/10* (2016.08); *G06F 1/20* (2013.01); *H01R 13/506* (2013.01); *H01R 33/0836* (2013.01); *H01R 2107/00* (2013.01)

(58) Field of Classification Search
USPC ... 439/336, 36, 56, 168, 182, 220, 280, 366, 439/232, 242, 356, 541, 55, 8, 893; 362/294
See application file for complete search history.

(56) References Cited

U.S. PATENT DOCUMENTS

| | | | |
|---|---|---|---|
| 4,780,799 A | 10/1988 | Groh | |
| 4,804,343 A * | 2/1989 | Reedy | H01R 33/06 439/318 |
| 5,435,741 A * | 7/1995 | Wang | F21V 17/14 439/314 |
| 5,685,638 A * | 11/1997 | Huang | F21S 6/001 313/318.09 |
| 5,749,743 A * | 5/1998 | Harada | H01R 33/46 439/336 |
| 6,232,707 B1 * | 5/2001 | Ranish | F21V 19/0005 313/318.01 |
| 6,409,547 B1 * | 6/2002 | Reede | H01R 13/6464 439/676 |
| 6,467,942 B2 * | 10/2002 | Alloway | H01R 13/5208 362/267 |
| 7,052,301 B2 * | 5/2006 | Garcia | H01R 33/09 362/249.14 |
| 7,479,044 B1 * | 1/2009 | MacCrindle | H01R 13/426 439/699.2 |
| 7,666,048 B1 * | 2/2010 | Gibboney, Jr. | F21V 19/0005 362/654 |
| 8,172,427 B2 * | 5/2012 | Hsu | F21V 19/0005 313/318.01 |
| 8,985,815 B2 * | 3/2015 | Chen | F21V 23/023 362/294 |
| 9,157,624 B2 * | 10/2015 | Nourbakhsh | F21V 23/06 |
| 2003/0148663 A1 * | 8/2003 | Hsin | H01R 13/6658 439/638 |
| 2003/0161108 A1 | 8/2003 | Bright et al. | |
| 2003/0174467 A1 | 9/2003 | Lu | |
| 2003/0222578 A1 | 12/2003 | Cok | |
| 2006/0133064 A1 * | 6/2006 | Lin | F21S 10/002 362/101 |
| 2006/0258215 A1 | 11/2006 | Lai et al. | |
| 2007/0119960 A1 | 5/2007 | Zheng | |
| 2009/0011793 A1 * | 1/2009 | Pocrass | H04M 1/274516 455/556.1 |
| 2010/0103621 A1 * | 4/2010 | Sun | F21V 19/006 361/704 |
| 2011/0136352 A1 | 6/2011 | Liu et al. | |
| 2011/0299274 A1 | 12/2011 | Schwarz | |
| 2011/0305056 A1 | 12/2011 | Chien | |
| 2012/0075863 A1 * | 3/2012 | Chen | F21V 21/002 362/249.18 |
| 2012/0097988 A1 | 4/2012 | Deng | |
| 2012/0194069 A1 * | 8/2012 | Wang | F21S 8/04 315/32 |
| 2012/0307501 A1 * | 12/2012 | Tankala | F21K 9/90 362/294 |
| 2012/0325453 A1 * | 12/2012 | Lin | H01L 23/3672 165/185 |
| 2013/0039071 A1 * | 2/2013 | Wang | F21V 3/00 362/294 |
| 2013/0043781 A1 * | 2/2013 | Wang | F21V 21/096 313/46 |
| 2013/0070454 A1 | 3/2013 | Zeng et al. | |
| 2013/0095677 A1 | 4/2013 | Jin et al. | |
| 2013/0157499 A1 | 6/2013 | Crippen et al. | |
| 2014/0078723 A1 * | 3/2014 | Chen | F21V 23/023 362/184 |
| 2014/0286015 A1 * | 9/2014 | Wang | F21V 29/004 362/294 |

FOREIGN PATENT DOCUMENTS

| | | |
|---|---|---|
| EP | 2565516 A1 | 6/2013 |
| GB | 2483113 A | 2/2012 |
| JP | 2013004176 A | 1/2013 |
| WO | 2012164506 A1 | 12/2012 |

\* cited by examiner

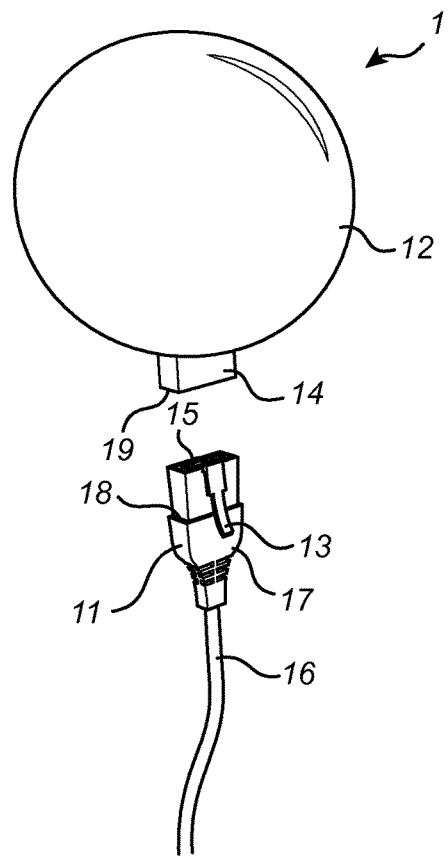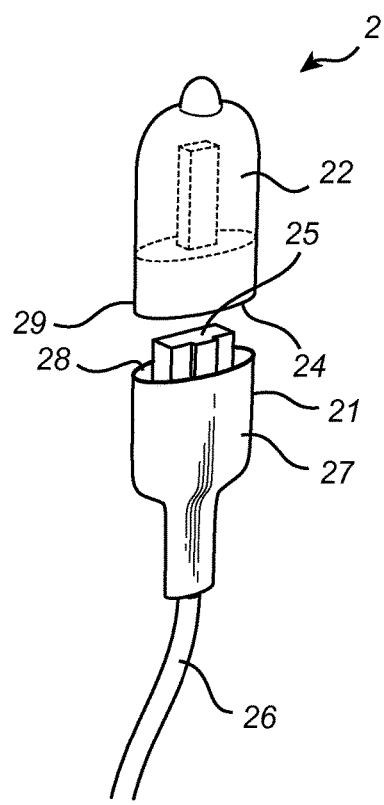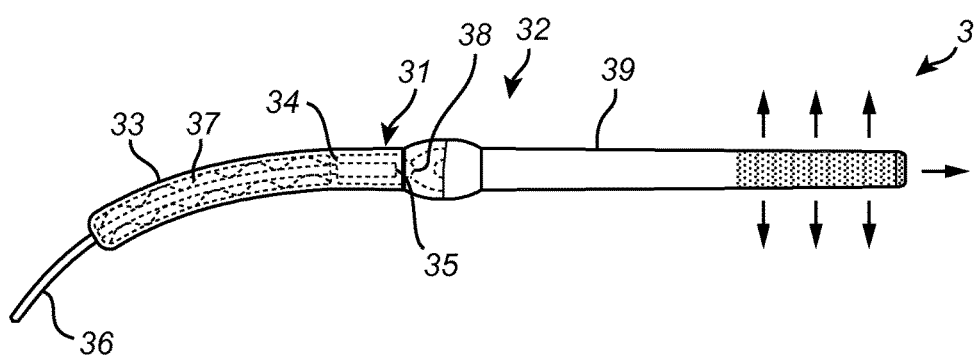
Fig. 1  Fig. 2
Fig. 3

LIGHTING DEVICE CONNECTOR COMPRISING A HEAT SINK

CROSS-REFERENCE TO PRIOR APPLICATIONS

This application is the U.S. National Phase application under 35 U.S.C. § 371 of International Application No. PCT/EP2014/070995, filed on Oct. 1, 2014, which claims the benefit of European Application No. 13187424.0, filed Oct. 4, 2013. These applications are hereby incorporated by reference herein.

FIELD OF THE INVENTION

The present invention generally relates to the field of connector plugs for supplying power to lighting devices, such as luminaires or light modules.

BACKGROUND OF THE INVENTION

Connector devices, such as sockets, for lighting devices, such as luminaires or lighting modules have the purpose of supporting and supply power to the lighting device. A socket comprises a fastening arrangement for mechanically coupling the lighting device to the socket and an electronic contact for supplying power to the lighting device. Correspondingly, a lighting device comprises a fastening arrangement and an electronic contact adapted to mate with the fastening arrangement and electronic contact of the socket. Normally, sockets are standardized, which allows mating lighting devices and sockets of different producers. Standard socket arrangements include e.g. screw type sockets and bi-pin type sockets.

Modern lighting device technologies, such as solid state (e.g. light emitting diode, LED) based lighting devices often require cooling for promoting longer life-time of the lighting devices. Normally, lighting devices based on such technologies comprise a heat sink for the purpose of dissipation of heat from the lighting device. However, such heat sinks may sometimes not suffice to achieve acceptable heat dissipation from the lighting device, which in particular may be the case for relatively small LED-based lighting devices, such as G4 and G9 type LED-based lighting devices, having limited heat dissipation surfaces due to the small dimensions of the lighting device.

SUMMARY OF THE INVENTION

It would be advantageous to achieve a connector device and a lighting device overcoming, or at least alleviating, the above mentioned drawbacks. In particular, it would be desirable to enable an alternative connector device for a lighting device compared to prior art techniques. Further, it would be desirable to enable a connector device for a lighting device enhancing heat dissipation from the lighting device.

To better address one or more of these concerns, a connector plug and a lighting device having the features defined in the independent claims are provided. Preferable embodiments are defined in the dependent claims.

Hence, according to an aspect, a connector plug for a lighting device is provided. The connector plug comprises a fastening arrangement for mechanically coupling the lighting device to the connector plug, and an electronic contact arranged to transfer power to, and communicate data with the lighting device coupled to the connector plug. Further, the connector plug comprises a heat sink having a heat reception interface arranged to receive heat from the lighting device coupled to the connector plug and a heat dissipation interface arranged to dissipate at least some of the heat received via the heat reception interface.

According to a further aspect, a lighting device for coupling to a connector plug as defined in the previous aspect is provided. The lighting device has a connector port arrangement comprising a fastening arrangement for mechanically coupling the lighting device to the connector plug, and an electronic contact arranged to receive power from, and communicate data with the connector plug. Further, the connector port arrangement comprises a heat dissipation interface arranged to transfer heat generated by the lighting device to the connector plug. Hence, the connector plug may be insertable in the connector port arrangement of the lighting device.

The present aspects are based on a concept of utilizing the connector plug for dissipating heat from the lighting device, whereby the overall heat dissipation from the lighting device increases, which promotes a longer life time of the lighting device. Heat generated by the lighting device (e.g. by one or more light sources and/or driving electronics of the lighting device) may be transferred via the heat dissipation interface (which also may be referred to as a heat dissipation surface) of the lighting device to the heat reception interface (which also may be referred to as a heat reception surface) of the heat sink of the connector plug. The heat is then transferred to, and dissipated by the heat dissipation interface (which also may be referred to as a heat dissipation surface) of the heat sink of the connector plug to the surroundings or to an external heat sink. The inventors have realized that, since connectors able to transfer power and data are usually relatively small in size, such connectors may advantageously be used e.g. for lighting devices of relatively small size having a limited heat dissipation area facing the surroundings. With the present aspects, the enhanced heat dissipation from the lighting device by means of the connector plug increases the overall heat dissipation area for such small size lighting devices. However, it will be appreciated that the present aspects may be applied to lighting devices of any size.

According to an embodiment, the electronic contact of the connector plug and/or the electronic contact or the lighting device may be a universal serial bus (USB) type contact or a modular connector type contact. Connectors having these standard contact types are usually smaller in size compared to e.g. standard screw type sockets. However, conventional USB and modular connectors are not able to dissipate any significant amount of heat generated by the device connected to the connector, as such connectors are thermally insulated by materials such as PVC (polyvinyl chloride) and does not comprise any cooling means. With the present embodiment, heat dissipation is enhanced by the configuration of the heat sink of the connector plug, whereby the USB or modular type connector may be used for supplying power to and (optionally) communicating data with the lighting device. The USB type contact may e.g. be of any one of the USB standards: type A, type B, mini-A, mini-B, micro-A, and micro-B. The modular connector type contact may e.g. be of any one of the standards: Category 6 (CAT-6), Category 5 (CAT-5), Category 5e (CAT-5e), 10P10C, 8P8C, 6P6C, 6P4C and 4P4C.

Modular connectors may also be referred to as "modular phone jack/plug", "RJ connector," and "Western jack/plug." The term "modular connector" arose from its original use in a novel system of cabling designed to make telephone equipment more modular. It is common to use a registered jack number to refer to the physical connector itself. For example, the 8P8C modular connector type is often referred to as RJ45 because the Registered Jack standard of that name was an early user of 8P8C modular connectors. Conventional 8P8C modular connectors are currently used e.g. for Ethernet over twisted pair. Further, the 4P4C connector may be referred to as RJ9 or RJ22 and various 6P connectors as RJ11.

According to an embodiment, the heat sink of the connector plug may comprise a material having a thermal conductivity of at least 1 W/(mK), such as metal, ceramics, silicon and/or thermal plastics, for conducting heat from the heat reception interface to the heat dissipation interface. The heat sink may e.g. comprise a solid piece of metal or a thermally insulating material with embedded metal pieces (or chips or particles). Further, the heat sink may comprise one or more heat pipes for improving cooling of the lighting device. With the present embodiment, the material of the heat sink enhances the heat dissipation from the lighting device via the connector plug.

Optionally, the lighting device may comprise a heat sink adapted to absorb heat generated by the lighting device, wherein the heat dissipation interface of the lighting device may be (at least partly) formed by a portion of a surface of the heat sink of the lighting device. The heat sink of the lighting device may comprise metal for conducting heat generated by the lighting device to the heat dissipation interface of the heat sink of the lighting device. However, the heat dissipation interface of the lighting device may be a surface of any component in the lighting device able to transfer heat generated by the lighting device. For example, the heat dissipation surface of the lighting device may (additionally or alternatively) be (at least partly) formed by the electronic contact. Further, the heat dissipation interface of the lighting device may be part of a surface of an optical element (e.g. reflector, collimator, etc.) of the lighting device.

According to an embodiment, the heat dissipation interface of the heat sink of the connector plug may comprise one or more fins (or wings). The fins increases the heat dissipation area, whereby cooling of the lighting device is enhanced.

According to an embodiment, the heat dissipation interface of the connector plug may comprise an optical element, such as a reflector and/or a collimator, thereby adding optical functionality to the connector plug.

According to an embodiment, the fastening arrangement of the connector plug may be of a positive lock type, such as of a bayonet type and/or a snap fit type. Correspondingly, the fastening arrangement of the lighting device may be of a positive lock type, such as of a bayonet type and/or a snap fit type, preferably adapted to mate with the fastening arrangement of the connector plug. The present embodiment is advantageous in that the fastening arrangements are more rigid, e.g. compared to the friction fastening mechanism of standard USB connectors, and reduces the risk of unintended separation of the connector plug and the lighting device. For example, the present fastening arrangements may allow suspending the lighting device in the connector plug.

According to an embodiment, the heat sink is formed as a sleeve. This provides for a simple solution for an improved heat transfer between the lighting device and the connector plug. In a further embodiment the sleeve is covered by a cover layer. The cover layer may provide for improved handling of the connector plug and/or protect a user from contacting the potentially hot or warm sleeve of the heat sink directly.

According to an embodiment, the connector plug may further comprise driving electronics for driving the lighting device. Hence, at least a part of the driving electronics for driving the lighting device may not necessarily be located in the lighting device, but instead in the connector plug. The present embodiment allows a more stripped (less complex) design of the lighting device. Further, it may be advantageous to separate the driving electronics from the light source of the lighting device, since driving electronics are typically rather sensitive to heat and most of the heat produced in the lighting device is generated by the light source. The driving electronics may e.g. comprise a circuit for controlling a light source of the lighting device. Optionally, other features related to the lighting device may be located in the connector plug, such as sensors, dimming circuits etc.

According to an embodiment, the connector plug may further comprise a cable arranged to be electrically connected to the electronic contact, wherein the cable may be arranged to transfer power and data. Further, the cable and the fastening arrangement (such as the dimensions and the rigidity of the cable and the fastening arrangement) may be adapted for suspending the lighting device. Hence, the cable used for supplying the power and data may additionally be used for suspension of the lighting device, e.g. in a ceiling. Further, the cable may comprise electromagnetic interference (EMI) shielding, which may comprise twined metal strings, which may function as an additional heat sink of the connector plug.

According to an embodiment, the lighting device may further comprise at least one solid state light source, such as one or more light emitting diodes (LEDs). Solid state light sources typically put a higher demand on cooling of the lighting device for achieving acceptable life times compared to traditional incandescent light sources. Solid state light sources normally generate less heat than incandescent light sources, but the heat generated by solid state light sources may not dissipated by means of radiation (as is the case with incandescent light sources) but in general only by means of conduction and convection. With the present embodiment, heat dissipation from the lighting device is increased by means of the connector plug.

According to an embodiment, a lighting system may be provided. The lighting system may comprise a connector plug as defined in any one of the preceding embodiments and a lighting device as defined in any one of the preceding embodiments, the lighting device being adapted for connection to the connector plug.

According to an embodiment, the heat reception interface of the connector plug may be arranged to be in direct (physical) contact with the heat dissipation interface of the lighting device, whereby the heat transfer from the lighting device to the connector plug is enhanced, which in turn improves cooling of the lighting device. For example, the locations and surface structures of the heat dissipation interface of the lighting device and of the heat reception interface of the connector plug may be adapted to mate with each other so as to provide physical contact.

It is noted that embodiments of the invention relates to all possible combinations of features recited in the claims. Those skilled in the art realize that different features of the present invention can be combined to create embodiments other than those described in the following.

BRIEF DESCRIPTION OF THE DRAWINGS

These and other aspects will be described in more detail with reference to the appended drawings.

FIG. 1 shows a lighting system of a lighting device and a connector plug according to an embodiment.

FIG. 2 shows a lighting system of a lighting device and a connector plug according to another embodiment.

FIG. 3 shows a lighting system of a lighting device and a connector plug according to yet another embodiment.

Figure 4:
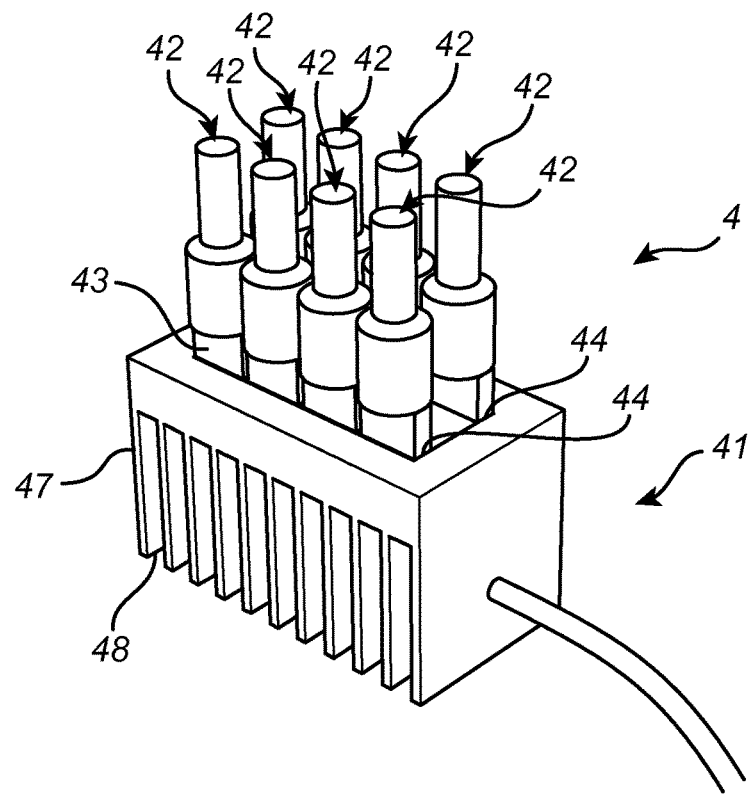
FIG. 4 shows a lighting system of a plurality of lighting devices and a connector plug according to yet another embodiment.

All the figures are schematic, not necessarily to scale, and generally only show parts which are necessary in order to elucidate the embodiments, wherein other parts may be omitted or merely suggested. Like reference numerals refer to like elements throughout the specification. Parts being obscured by other parts in the drawings are illustrated with dashed lines.

DETAILED DESCRIPTION

A lighting system according to an embodiment will be described with reference to FIG. 1. FIG. 1 shows a lighting system 1 comprising a lighting device 12, such as a luminaire 12 or a lighting module, and a connector plug 11 for supplying power and (optionally) data to the lighting device 12. For example, data may be transmitted to the lighting device 12 via the connector plug 11 for controlling the lighting device 12. Further, data may be transmitted from the lighting device 12 via the connector port, e.g. for retrieving operation information regarding the lighting device 12. In the present example, the connector plug 11 is a universal serial bus (USB) type connector plug and the lighting device comprises a USB connector port 14 adapted to receive the connector plug 11. The lighting device 12 may e.g. be a bulb type lighting device 12. The connector plug 11 comprises a fastening arrangement 13 adapted to mate with a fastening arrangement of the lighting device 12 (not shown) so as to mechanically couple (fixate) the lighting device 12 to the connector plug 11. In the present example, the fastening arrangements of the lighting device 12 and the connector plug comprise a (preferably releasable) snap fit connection. For example, the snap fit connection may comprise a hook arranged at one of the connector plug 11 and the lighting device 12 and a recess adapted to mate with the hook arranged at the other one of the connector plug 11 and the lighting device 12 (such as within the connector port 14 of the lighting device 12) so as to lock the mechanical connection between the lighting device 12 and the connector plug 11.

The connector plug 11 further comprises a heat sink 17, the outer surface of which forms a heat dissipation interface towards the surroundings. Further, the heat sink 17 has a heat reception interface 18 in thermal connection with the heat dissipation interface, e.g. via a core of the heat sink 17. The heat sink 17 may comprise metal for providing a thermal path from the heat reception interface 18 to the heat dissipation interface. The lighting device 12 comprises a heat dissipation interface 19 able to dissipate heat generated by the lighting device 12. Such heat may e.g. be generated by one or more light sources, such as light emitting diodes (LEDs), and/or by driving electronics comprised in the lighting device 12. The heat dissipation interface 19 of the lighting device 12 may e.g. be a surface portion of the port 14 and/or of a heat sink of the lighting device 12 (not shown), or of any component of the lighting device 12 able to absorb (and conduct) heat generated in the lighting device 12. The heat dissipation interface 19 of the lighting device 12 and the heat reception interface 18 of the connector plug 11 are arranged such that heat can be transferred there between when the lighting device 12 is coupled to the connector plug 11. Preferably, the heat dissipation interface 19 of the lighting device 12 and the heat reception interface 18 of the connector plug 11 are adapted to mate with each other so as to provide physical contact there between when the lighting device 12 is coupled to the connector plug 11.

The connector plug 11 may further comprise an electronic contact 15 and a cable 16 electrically connected to the electronic contact 15 for supplying power and communicating data. The lighting device 12 may comprise a corresponding electronic contact (not shown), e.g. arranged in the port 14, adapted to mate with the electronic contact 15 of the connector plug 11 when the connector plug 11 is coupled to the lighting device 12. In the present example, the electronic contacts of the lighting device 12 and the connector plug 11 are USB type electronic contacts.

The connector plug 11 may be coupled to the lighting device 12 by inserting the connector plug 11 in the port 14 such that the fastening arrangements (the snap fit mechanism) locks the lighting device 12 to the connector plug 11, whereby the electronic contacts of the lighting device 12 and the connector plug 11 are electrically connected and power (and optionally data) can be supplied to the lighting device 12. When the lighting device 12 is switched on, heat is generated by the components of the lighting device 12, which heat is conducted via the heat dissipation interface 19 of the lighting device 12 to the heat reception interface 18 of the connector plug 11 and then further on, via the core of the heat sink 17 of the connector plug 11, to the heat dissipation interface (i.e. the outer surface of the heat sink 17) of the connector plug 11, where the heat is dissipated to the surroundings. In this way, the lighting device 12 is cooled by means of the connector plug 11.

Optionally, the driving electronics for driving the lighting device 12 and/or other components for controlling/monitoring the lighting device 12 (such as sensors) may be arranged in the connector plug 12.

In the following, systems and devices according to further embodiments will be described, which in principle may be similarly configured as the system and devices described with reference to FIG. 1 and operate according to the same principle as described above. It will be appreciated that various features described in the following may be combined with the embodiment described with reference to FIG. 1 and with each other.

FIG. 2 shows a lighting system 2 comprising a lighting device 22 and a connector plug 21 according to an embodiment. In the present example, an electronic contact 25 of the connector plug 21 and a corresponding electronic contact of the lighting device 22 are mini USB contacts, which in particular may be advantageous for small lighting devices.

In the present example, the lighting device 22 may be G4 or G9 type lighting device having a port 24 compatible for connection to the mini USB type connector plug 21. Further, a heat sink of the connector plug 21 may be formed as a sleeve 27 having a heat reception interface 28 on the inside of the sleeve adapted to surround a portion 29 of the lighting device 22. The outer surface of the portion 29 of the lighting device 22 surrounded by the sleeve 27 may form (at least a part of) a heat dissipation interface 28 of the lighting device 22. Further, the outside (or outer surface) of the sleeve 27 may form a heat dissipating interface of the connector plug 22. The sleeve 27 may extend substantially from the end portion of the connector plug 22 and along a portion of a cable 26 of the connector plug 21. In the present example, heat generated by the lighting device 22 is conducted to, and dissipated by the sleeve 27 of the connector plug 21.

FIG. 3 shows a lighting system 3 comprising a lighting device 32 and a connector plug 31 according to another embodiment. In the present example, a heat sink of the connector plug 31 may comprise a flexible metal foil 37, optionally covered by a flexible cover 33. The foil 37 (and the cover 33) may be pleated (or curved) and extend along a portion of the cable 36. In the present example, the connector plug 31 is a USB connector plug having a USB electronic contact 35 and the lighting device 32 may comprise a corresponding USB connector port 34. A thermal interface between the connector plug 31 and the lighting device 32 may e.g. be provided at the USB plug/port interface. Further, in the present example, the lighting device 32 comprises an LED 38 (e.g. of the type L2) and a light guide 39 optically coupled to the LED 38. The light guide 39 may comprise a light out coupling surface for emitting light propagating in the light guide 39. In the present example, heat generated by the lighting device 31 is conducted via the plug/port interface and then dissipated via the metal foil 37 and the cover 33 of the connector plug 31.

FIG. 4 shows a lighting system 4 comprising a plurality of lighting devices 42 connected to a connector plug 41 according to an embodiment. The lighting devices 42 may comprise light guides, as shown in FIG. 4, and/or other optical elements, such as reflectors, total internal reflection (TIR) collimators and/or lenses (not shown). In the present example, the connector plug 41 may comprise a heat sink block 47, preferably made of metal. The block 47 may comprise one or more fins 48 for increasing the heat dissipation area of the connector plug 41. The connector plug 41 may comprise one or more ports 44 in which the electronic contacts of the connector plug 41 may be arranged. The lighting devices 42 may comprise plugs 43 for insertion in the ports 44. The electronic contacts of the lighting devices 42 may be arranged in the plugs 43. In the present example, heat generated by the lighting devices 42 is dissipated via the block 47 of the connector plug 41.

Figure 5:
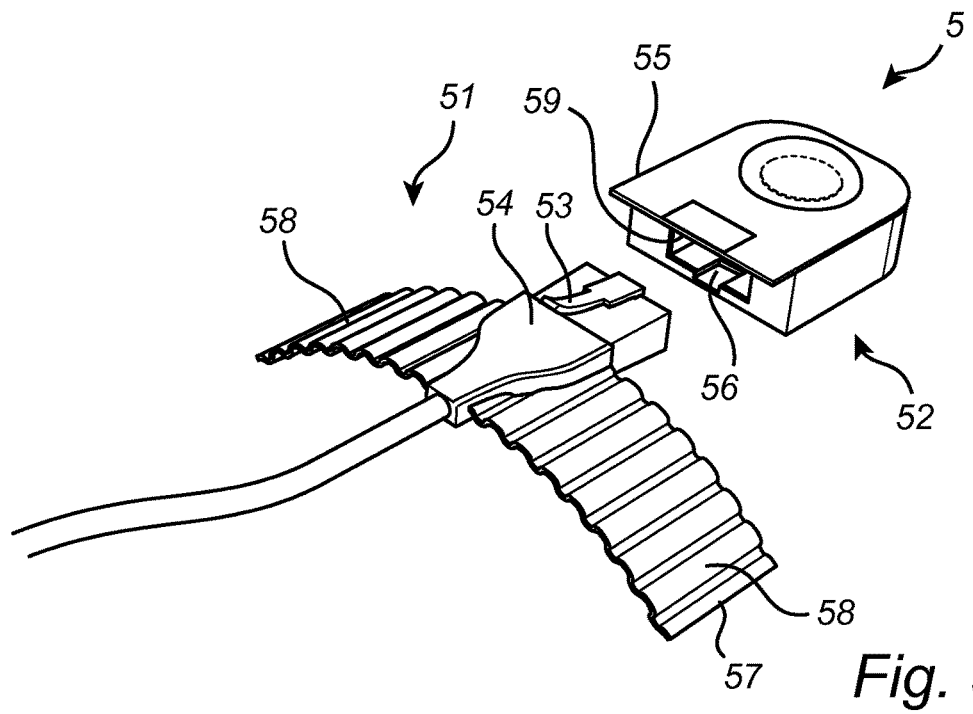
FIG. 5 shows a lighting system of a lighting device and a connector plug according to yet another embodiment.

FIG. 5 shows a lighting system 5 comprising a lighting device 52 and a connector plug 51 according to another embodiment. In the present example, the connector plug 51 comprises a Category 5 (CAT-5) contact having a snap fit fastening arrangement 53 and the lighting device 52 comprises a corresponding CAT-5 connector port 56 with a mating snap fit fastening arrangement. The lighting device 52 further comprises a heat sink forming a projecting portion 55 of the lighting device 52 and having a heat dissipation interface 59. The connector plug 51 comprise a heat sink 57 having a heat reception surface 54 arranged such that the heat dissipation interface 59 of the lighting device 52 overlaps and directly contacts the heat reception interface 54 of the connector plug 51 when the lighting device 52 is coupled to the connector plug 51. In the present example, the heat sink 57 of the connector plug 51 may comprise one or more fins (or wings) 58, the surface of which forms (at least a part of) the heat dissipation interface of the connector plug 51. Optionally, the fins 58 may be pleated. When the connector plug 51 is coupled to the lighting device 52, the heat dissipation interface 59 slides in place over the heat reception interface 54 of the connector plug 51, whereby heat is enabled to be conducted from the lighting device 52 to the connector plug 51 and subsequently dissipated via the fins 58.

Figure 6:
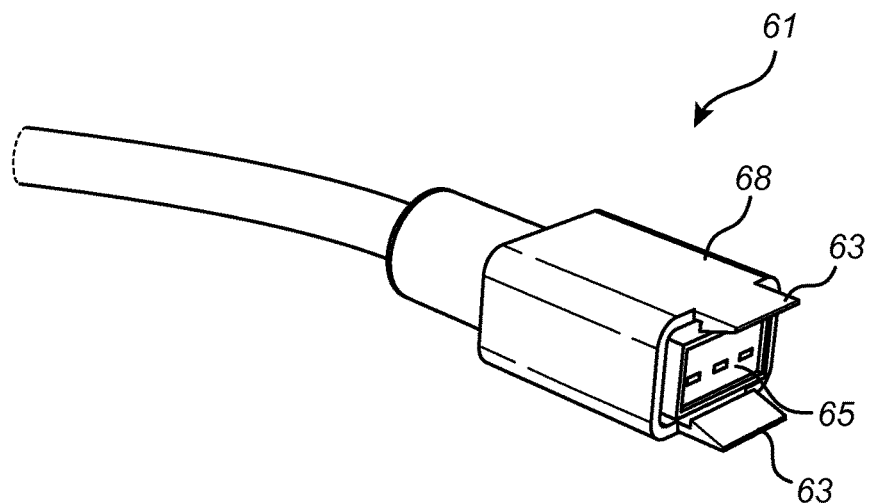
FIG. 6 shows a connector plug according to an embodiment.
Figure 7:
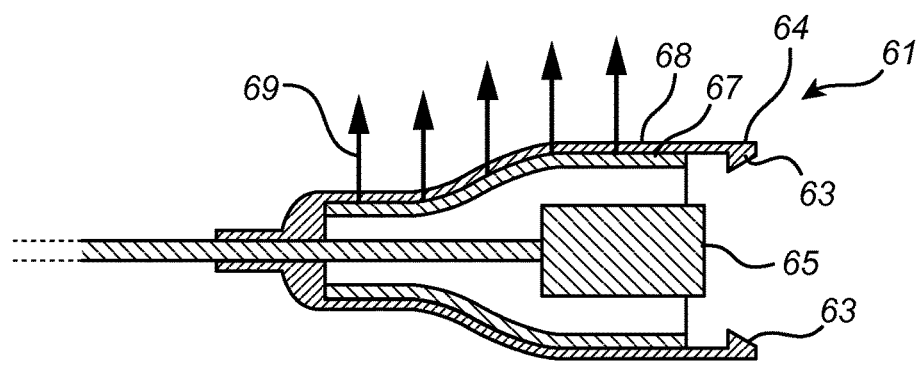
FIG. 7 shows a cross-section of the connector plug shown in FIG. 6.

FIG. 6 is a perspective view of a connector plug 61 according to an embodiment. FIG. 7 shows a cross-section of the connector plug 61 shown in FIG. 6. In the present example, the connector plug 61 is a CAT-x type contact, such as a CAT-5 or CAT-6 connector plug, comprising a CAT-x electronic contact 65. The electronic contact 65 is at least partly surrounded by a sleeve 64 comprising a heat sink layer 67 and an outer cover layer 68. At the end of the sleeve 64, a snap fit fastening arrangement 63 is arranged. When a lighting device is connected to the connector plug 61, a corresponding CAT-x connector port of the lighting device is inserted in the sleeve 64 such that the electronic contact 65 of the connector plug 61 comes in contact with the electronic contact in the connector port of the lighting device (not shown). The outside of the connector port of the lighting device may then come into contact with the inner surface of the heat sink layer 67 of the sleeve 64, whereby heat may be conducted from the lighting device to the heat sink layer 67 of the connector plug 61. The heat 69 may then dissipate from the heat sink 67 via the cover 68 to the surroundings.

Figure 8:
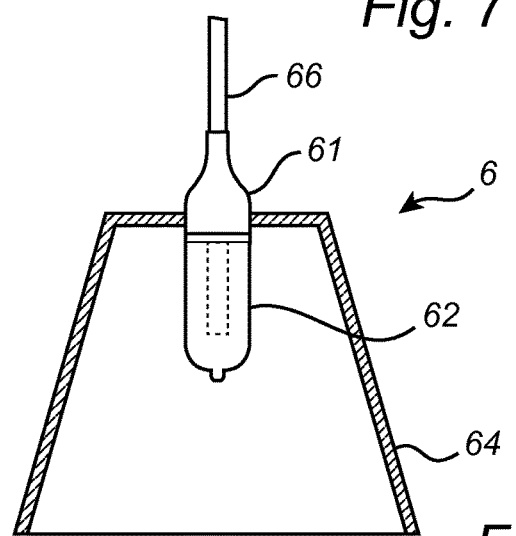
FIG. 8 shows a lighting system of a lighting device suspended by means of the connector plug shown in FIG. 6.

FIG. 8 shows a lighting system 6 comprising the connector plug 61 described with reference to FIGS. 6 and 7 connected to a lighting device 62. The cable 66 of the connector plug 61 may be used for suspending the lighting device 62. Optionally, the connector plug 61 may comprise a reflector 64 arranged to reflect light emitted by the lighting device 62.

While embodiments of the invention have been illustrated and described in detail in the drawings and foregoing description, such illustration and description are to be considered illustrative or exemplary and not restrictive; the invention is not limited to the disclosed embodiments. For example, the fastening arrangement may be of a bayonet type or any other, preferably rigid, fastening arrangement type. Further, the lighting device may be any kind of lighting device, such as any kind of solid state lighting device or a gas discharge lamp.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A connector plug for a lighting device, the connector plug comprising:
   a fastening arrangement for mechanically coupling the lighting device to the connector plug, wherein the fastening arrangement is of a positive lock type,
   an electronic contact arranged to transfer power to, and communicate data with the lighting device coupled to the connector plug, wherein the electronic contact is a universal serial bus type contact or a modular connector type contact, and is arranged to be electronically connected to a cable, and
- a heat sink having a heat reception interface arranged to receive heat from the lighting device coupled to the connector plug and a heat dissipation interface arranged to dissipate at least some of the heat received via the heat reception interface,
- wherein the data is transmitted to the lighting device via the connector plug for controlling the lighting device, and is transmitted from the lighting device via the connector plug for retrieving operation information regarding the lighting device.

2. The connector plug as defined in claim 1, wherein the heat sink comprises a material having a thermal conductivity of at least 1 W/(mK) for conducting heat from the heat reception interface to the heat dissipation interface.

3. The connector plug as defined in claim 1, wherein the heat dissipation interface comprises one or more fins.

4. The connector plug as defined in claim 1, wherein the fastening arrangement is of a bayonet type lock or a snap fit type lock.

5. The connector plug as defined in claim 1, further comprising driving electronics for driving the lighting device.

6. The connector plug as defined in claim 5, wherein the cable and the fastening arrangement are adapted for suspending the lighting device.

7. A lighting device for coupling to a connector plug as defined in claim 1, the lighting device having a connector port arrangement comprising:
- a fastening arrangement for mechanically coupling the lighting device to the connector plug,
- an electronic contact arranged to receive power from, and communicate data with the connector plug, wherein the electronic contact is a universal serial bus type contact or a modular connector type contact, and
- a heat dissipation interface arranged to transfer heat generated by the lighting device to the connector plug.

8. The lighting device as defined in claim 7, further comprising at least one solid state light source.

9. A lighting system comprising a connector plug as defined in claim 1.

10. The lighting system as defined in claim 9, further including:
the lighting device having a connector port arrangement coupling the lighting device to the connector plug,
wherein the heat reception interface of the connector plug is arranged to be in direct contact with a heat dissipation interface of the lighting device.

11. The connector plug as defined in claim 1, wherein:
the fastening arrangement is a mechanical lock structure coupled with the electronic contact to form an interlock between the connector plug and the lighting device.

12. The connector plug as defined in claim 11, wherein:
the electronic contact is a Category 5 (CAT-5) contact having a snap fit as the fastening arrangement; and
the heat dissipation interface comprises one or more fins, and the fins are pleated.

13. The connector plug as defined in claim 1, wherein the heat dissipation interface includes a collimator.

14. A connector plug for a lighting device, the connector plug comprising:
- a fastening arrangement for mechanically coupling the lighting device to the connector plug,
- an electronic contact arranged to transfer power to, and communicate data with the lighting device coupled to the connector plug, wherein the electronic contact is a universal serial bus type contact or a modular connector type contact, and is arranged to be electronically connected to a cable, and
- a heat sink having a heat reception interface arranged to receive heat from the lighting device coupled to the connector plug and a heat dissipation interface arranged to dissipate at least some of the heat received via the heat reception interface,
- wherein the heat sink is formed as a sleeve extended substantially from an end portion of the connector plug and having the heat reception interface on an inside surface of the sleeve, and the inside surface of the sleeve surrounds a substantial portion of an outside surface of the lighting device for heat dissipation.

15. The connector plug as defined in claim 14, wherein the sleeve is covered by a cover layer.

16. The connector plug as defined in claim 14, wherein the fastening arrangement is a snap fit structure arranged at an end of the sleeve.

17. The connector plug as defined in claim 14, wherein the sleeve extends along a portion of the cable of the connector plug.

* * * * *